(12) United States Patent
Howard

(10) Patent No.: US 6,250,450 B1
(45) Date of Patent: Jun. 26, 2001

(54) CONVEY IMPACT LINEAR

(75) Inventor: R. Scott Howard, Benton, KY (US)

(73) Assignee: Arch Environmental Equipment, Inc., Paducah, KY (US)

( * ) Notice: Subject to any disclaimer, the term of this patent is extended or adjusted under 35 U.S.C. 154(b) by 0 days.

(21) Appl. No.: 09/524,460

(22) Filed: Mar. 13, 2000

Related U.S. Application Data

(63) Continuation-in-part of application No. 09/023,067, filed on Feb. 13, 1998, now Pat. No. 6,041,906.

(51) Int. Cl.[7] .................................................. B65G 11/00
(52) U.S. Cl. .............................................................. 193/2 R
(58) Field of Search .................... 193/2 R, 4, 3, 193/25 E, 25 FT, 28, 34

(56) References Cited

U.S. PATENT DOCUMENTS

| | | |
|---|---|---|
| D. 364,028 | 11/1995 | Rouleau . |
| 2,174,716 | 10/1939 | Bethell . |
| 2,311,501 | 2/1943 | Zoldok . |
| 3,699,732 | 10/1972 | Janssen et al. . |
| 4,040,530 | 8/1977 | Mahr et al. . |
| 4,054,194 | 10/1977 | Davis . |
| 4,086,168 | 4/1978 | Moore . |
| 4,234,182 | 11/1980 | Camilleri . |
| 4,547,985 | 10/1985 | Sillins et al. . |
| 4,645,055 | 2/1987 | Griese et al. . |
| 5,055,336 | 10/1991 | Davis . |
| 5,109,970 | 5/1992 | Zaborszki . |
| 5,184,706 | 2/1993 | Christenson . |
| 5,349,996 | 9/1994 | McGregor . |
| 5,429,312 | 7/1995 | Ohno et al. . |
| 5,461,975 | 10/1995 | Driggs . |
| 5,480,018 | 1/1996 | Sasaki . |
| 6,041,906 | * 3/2000 | Howard ................................ 193/2 R |

* cited by examiner

*Primary Examiner*—James R. Bidwell
(74) *Attorney, Agent, or Firm*—Lloyd L. Zickert

(57) ABSTRACT

An impact liner for an impact surface in a chute of a conveyor or on a screen deck in a granule classification machine, the conveyor bearing granular coal, aggregate, or other granular material which is within a given granule size range. The chute has at least one impact surface against which the granular material impacts when the material is input to or discharged from the conveyor; usually, there are plural impact surfaces in the chute. The chute or impact liner includes a base plate of molded elastomer conforming to and mounted on the impact surface of the chute or on a screen deck. A multiplicity of elastomer knobs are molded integrally with the base plate and project toward the interior of the chute when the liner is mounted on the chute impact surface. The knobs are of truncated conical configuration and are effectively spaced from each other by distances greater than the size of the smaller granules of the granular material, so that granular material accumulates between the knobs to afford a renewable wear surface within the chute. Fasteners are provided for mounting the chute liner in the conveyor chute with the base of the liner covering at least a portion of the inner impact surface of the chute. When used as an impact liner or member for a screen deck, the impact member will be mounted on the screen deck at an impact area for granular material being fed to the screen deck.

36 Claims, 4 Drawing Sheets

CONVEY IMPACT LINEAR

DESCRIPTION

This application is a continuation-in-part of my application Ser. No. 09/023,067 filed Feb. 13, 1998, U.S. Pat. No. 6,041,906.

This invention relates in general to an impact liner or member for granular material, and more particularly to a chute liner to extend the life of a chute and an impact member to extend the life of a screen deck.

BACKGROUND OF THE INVENTION

In many industrial installations, including coal mines, power stations, concrete mixing plants, and many others, it is necessary or desirable to move appreciable quantities of granular material from one location to another. For example, in a coal mine quantities of granular coal may need to be moved, often in two or more steps, from a mine face to a storage location for subsequent shipment to a coal consumer. In a power station utilizing granular coal for fuel, the coal is often initially stored at a site separate from the power generating installation and is subsequently delivered to that installation as needed. Similarly, the ash or other waste product produced by burning of the coal may require removal from the power generation facility to yet another separate location. In a concrete mixing plant a granular stone aggregate may be initially stored at a location remote from the mixing plant; in such an installation, the aggregate may be moved to the mixing plant when it is needed.

In these and many other industrial facilities a conveyor, usually a belt conveyor, is employed to transport the granular material (e.g., coal, granular stone aggregate, etc.) to or from the location at which it is utilized. Most such conveyors have an input chute for delivering the granular material to the conveyor and a discharge chute for discharge of the granular material at the output end of the conveyor. In either case, the chute often includes one or more impact surfaces on which the granular material impinges. Those impact surfaces are often subject to appreciable abrasion from the granular material, and hence present a continuing requirement for repair and/or replacement of the chute.

Prior proposals directed toward amelioration or correction of these and similar abrasion problems have included corrugations, formed in sheet metal or metal plates, to guide movement of the granular material. Multiple short knobs of molded metal have also been suggested. But prior proposals addressing this difficulty have generally been unduly expensive or have not fully met the abrasion problems presented.

Further, in the sizing of granular material such as coal, screen deck systems in a granule sizing machine or classification machine are used for receiving and sizing the coal. These screens are generally angularly disposed to receive a stream of coal or granular material from the discharge end of a conveyor. A screen impact surface for receiving the stream of coal or granular material is usually at the input end of the first or uppermost screen. Wear on the impact surface requires periodic replacement or repair of the screen.

SUMMARY OF THE INVENTION

It is a primary object of the present invention, therefore, to provide a new and improved impact liner for an impact surface of a conveyor chute or screen deck, input or output, that is simple and inexpensive to manufacture and to install on the impact surface, which impact liner is effective to minimize or even eliminate the problem of abrasion from conveyance of a granular material.

It is a further object of the present invention to provide a new and improved conveyor impact liner for a granular material impact surface that utilizes the granular material itself in reducing wear on the impact surface.

A further object of the invention is to provide an impact liner or member for a screen deck impact area to reduce wear of the screen.

Accordingly, the invention relates to a chute liner or impact member for an impact surface of an input chute or discharge chute or a screen deck for a conveyor bearing granular coal, aggregate, or other granular material within a given granular size range. When used in a chute, it will be mounted on at least one impact surface against which the granular material impacts when the material is input to or discharged from the conveyor. When used for enhancing the life of a screen deck, the impact member will be mounted on the screen deck impact area. It should also be appreciated the impact liner of the invention may be used to enhance the life of any granular material impact area.

The chute or impact liner includes a base plate of molded elastomer having a base portion conforming to the impact surface of the chute or screen deck. It should be appreciated that the liner may be molded from any suitable elastomeric material. A multiplicity of elastomer knobs are molded integrally with the base plate; they project toward the interior of the chute or impact surface when the liner is mounted on the impact surface of a chute or other member. The knobs may be of truncated conical configuration or any other suitable configuration and are spaced from each other by distances greater than the size of the smaller granules of the granular material so that some of the granular material accumulates between the knobs to afford a renewable wear surface. There are also means for mounting the liner to a conveyor impact member, with the base of the liner covering at least a portion of the inner impact surface of the member.

DESCRIPTION OF THE INVENTION

Figure 1:
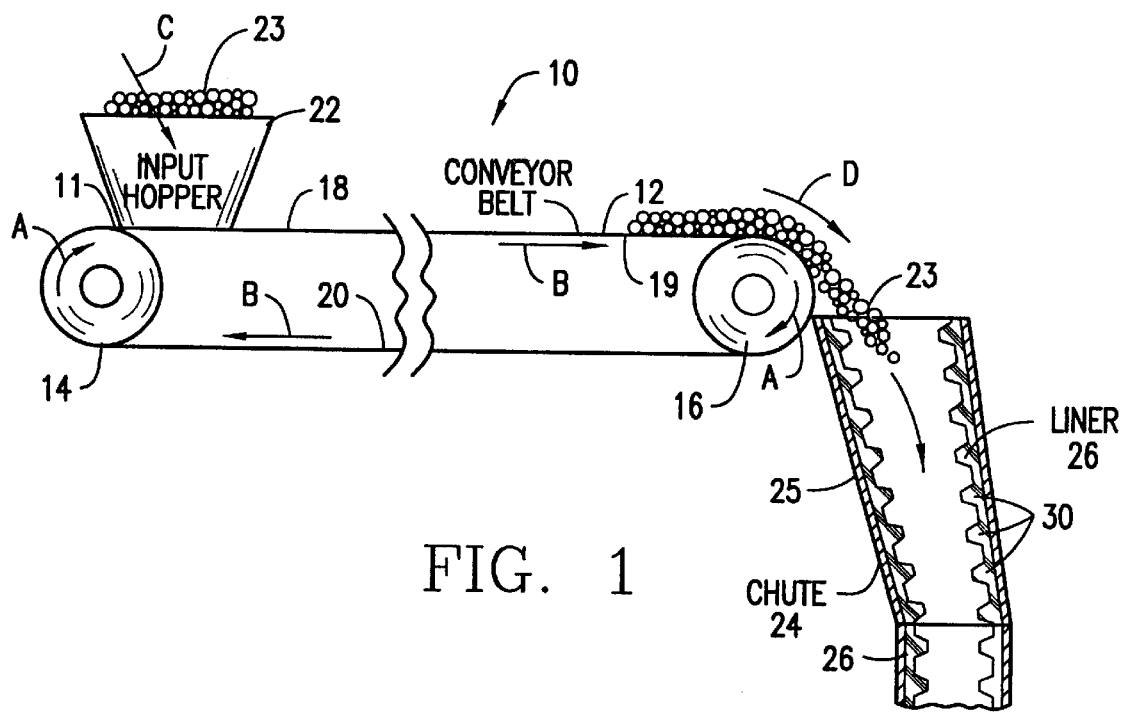
FIG. 1 is a schematic side elevation view of a typical belt conveyor for granular material.

FIG. 1 affords a schematic illustration of a conveyor system 10 having an input end 11 and an output or discharge end 12. At the input end 11 there is an impact pulley 14; the output end includes a discharge pulley 16. Either of the two pulleys 14 and 16 may be driven by any suitable driving means, the direction of rotation of the pulleys being indicated by the arrows A. A conveyor belt 18 having a material-bearing run 19 and a return run 20 engages both of the pulleys; the belt moves in the direction indicated by the arrows B. The length of the conveyor is determined by the needs of the user; only the input and output ends of the pulley have been shown.

At the input end of the conveyor system 10 there is an input hopper or chute 22 into which granular material 23 is fed in the direction indicated by the arrow C. At the output or discharge end of the conveyor system 10 there is a discharge chute 24 into which the granular material 23 is discharged from belt 18 to be fed to a storage pile or other like destination. The direction of movement of the granular material 23 from conveyor belt 18 (actually from the material-bearing run 19 of the belt) into discharge chute 24 is indicated by arrow D. Chute 24 is shown as having at least one impact surface 25 against which the granular material 23 impinges as it enters the chute. In actual fact there may be a plurality of such impact surfaces 25. It is these impact surfaces 25 that are worn or even destroyed by abrasion from granular material 23. A liner 26 is shown on the impact surface in the discharge chute 24 of the conveyor system 10. The input chute 22 of the conveyor belt system would also include at least one impact surface against which the material 23 impinges.

Figure 2:
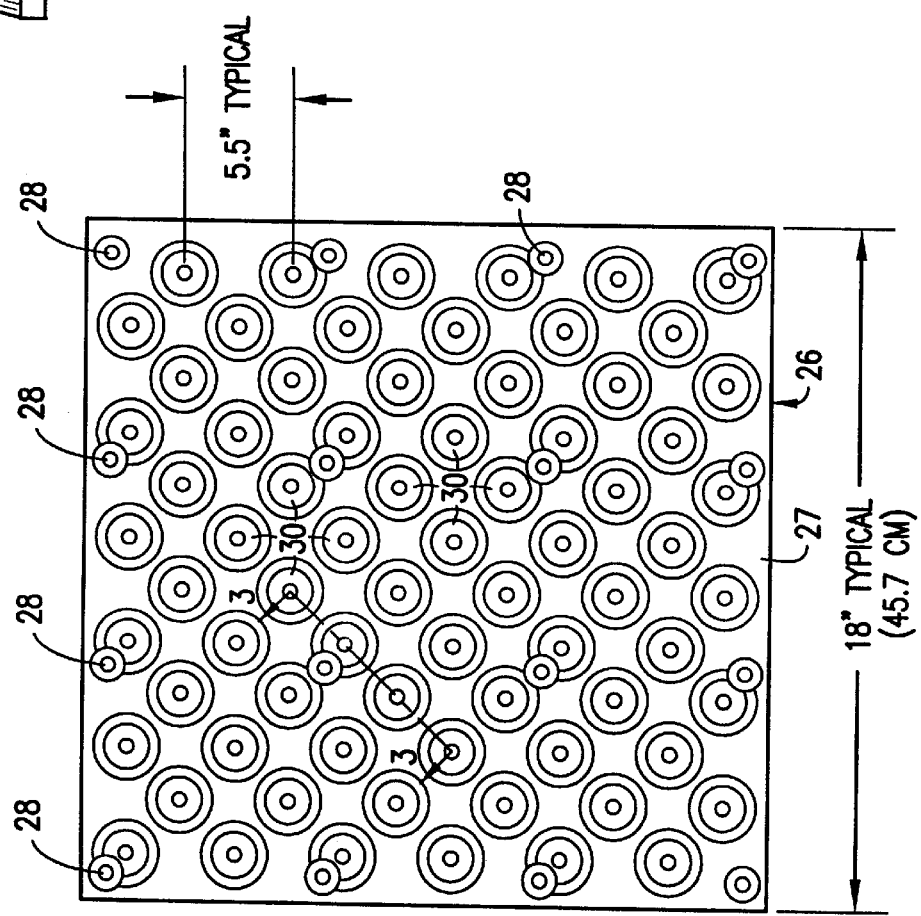
FIG. 2 is a plan view of a chute liner for the conveyor shown in FIG. 1.

The construction and operation of one embodiment of the chute liner 26, which liner constitutes the subject of the present invention, can best be understood by reference to FIGS. 2 to 5. As best shown in FIG. 2, chute liner 26 includes a base plate 27. Base plate 27 may be of rectangular configuration, assuming that is the configuration required for an impact surface within the conveyor chute in which the chute liner is to be mounted. Other configurations for the base plate may be employed if desired or if required. Base plate 27 is molded with a plurality of bolt apertures 28 so that it can be readily mounted upon a chute impact surface. The base plate 27 of chute liner 26, as illustrated, may have a thickness of about 0.56 inch (1.27 cm). The dimensions shown in FIG. 2 are exemplary of the preferred embodiment; they are subject to change. The preferred elastomer for plate 27 of chute liner 26 is polyurethane, but other elastomers or resins may be utilized as desired. Preferably, polyurethane with a Shore A hardness in a range of 80 to 90 is used.

Chute liner 26 further includes a multiplicity of elastomer knobs 30. Knobs 30 are molded integrally with base plate 27 and project inwardly toward the interior of the conveyor chute when the chute liner is mounted on the impact surface of the chute, such as surface 25 in discharge chute 24 (FIG. 1). In the rectangular chute liner 26 illustrated in FIG. 2, there are a total of seventy-two knobs, but that number is not critical; it depends upon the size of the knobs and the displacement between knobs, as well as the size of the impact area to be protected.

Figure 3:
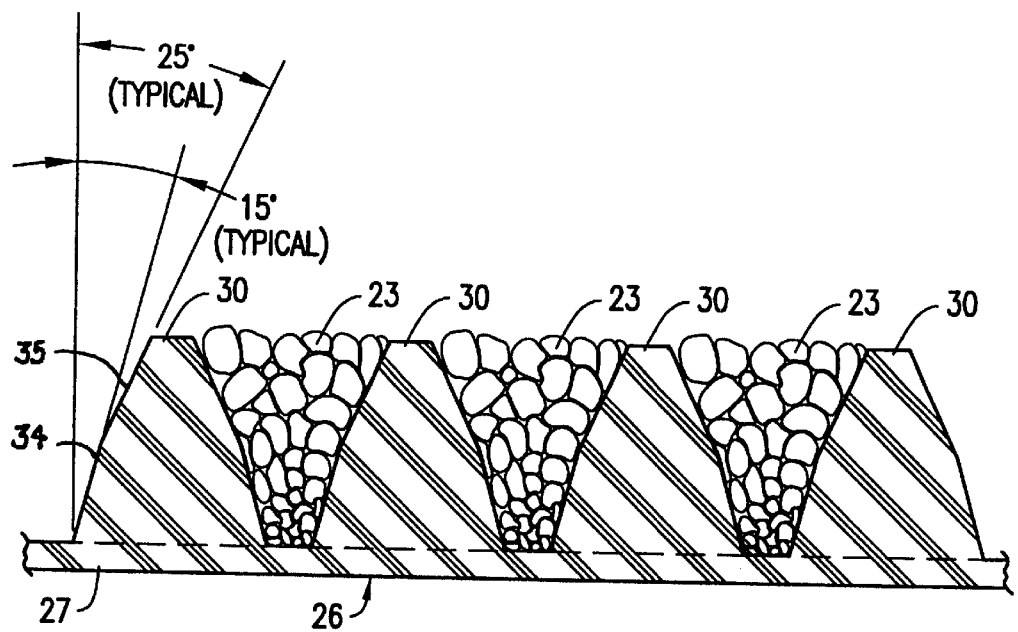
FIG. 3 is a sectional elevation view, on an enlarged scale, of a portion of the chute liner of FIG. 2, taken approximately along line 3—3 therein.
Figure 4:
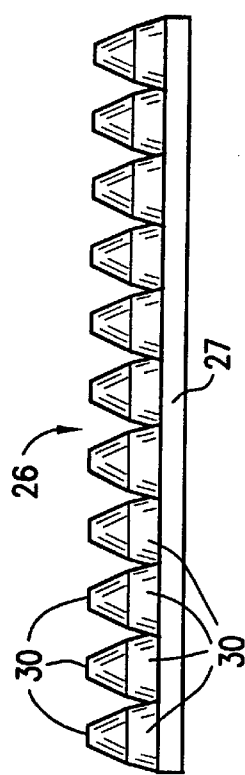
FIG. 4 is an end elevation view of the chute liner of FIGS. 1 and 2.
Figure 5:
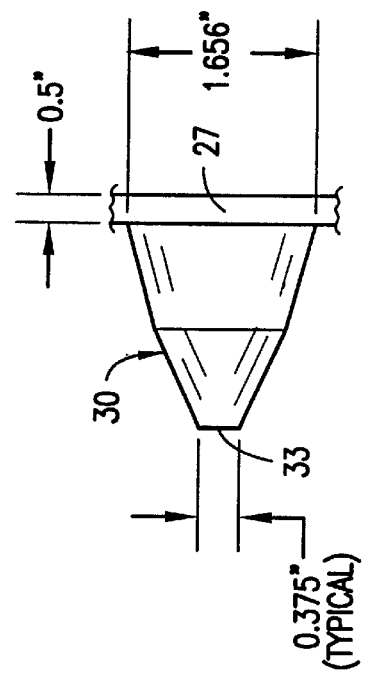
FIG. 5 is a detail view illustrating the knob construction employed in the chute liner of the embodiment of the invention shown in FIGS. 1 to 4.

Each of the multiplicity of elastomer knobs 30 is molded integrally with the impact plate 27 of chute liner 26, as best shown in FIGS. 3 and 5. Knobs 30 project toward the interior of the chute in which liner 26 is mounted when liner 26 is mounted on the impact surface of the chute; see FIG. 1. Knobs 30 are each of truncated conical configuration having a wide base of approximately 1.656 inch (4.2 cm) and an end surface 33 of approximately 0.375 inch (1 cm) as shown in the detail view, FIG. 5. Actually, in the specific chute liner construction shown in the drawings, knobs 30 are of dual tapered configuration having two conical faces, each having a base portion 34 with a taper of 15° and an end portion 35 with a taper of approximately 25°. Any number of conical faces may be provided for a knob. Knobs 30 are spaced from each other by distances somewhat greater than the size of the smallest granules of the granular material 23 (FIG. 1) so that granular material 23 accumulates between the knobs, as shown in FIG. 3, to afford a renewable wear surface within the discharge chute in which chute liner 26 is mounted.

In operation, chute liner 26 collects granular material 23 between knobs 30, as best shown in FIG. 3. It can be readily seen that the accumulation of granular material between the knobs affords the desired renewal wear surface along the tops of the chute liner knobs and effectively protects the impact surface of the chute itself from abrasion due to the impingement of the granular material. Of course, the chute liner should be mounted closely in conformity to the impact surface within the chute; this is made possible by the many mounting openings 28 in the chute liner (see FIG. 2).

Figure 6:
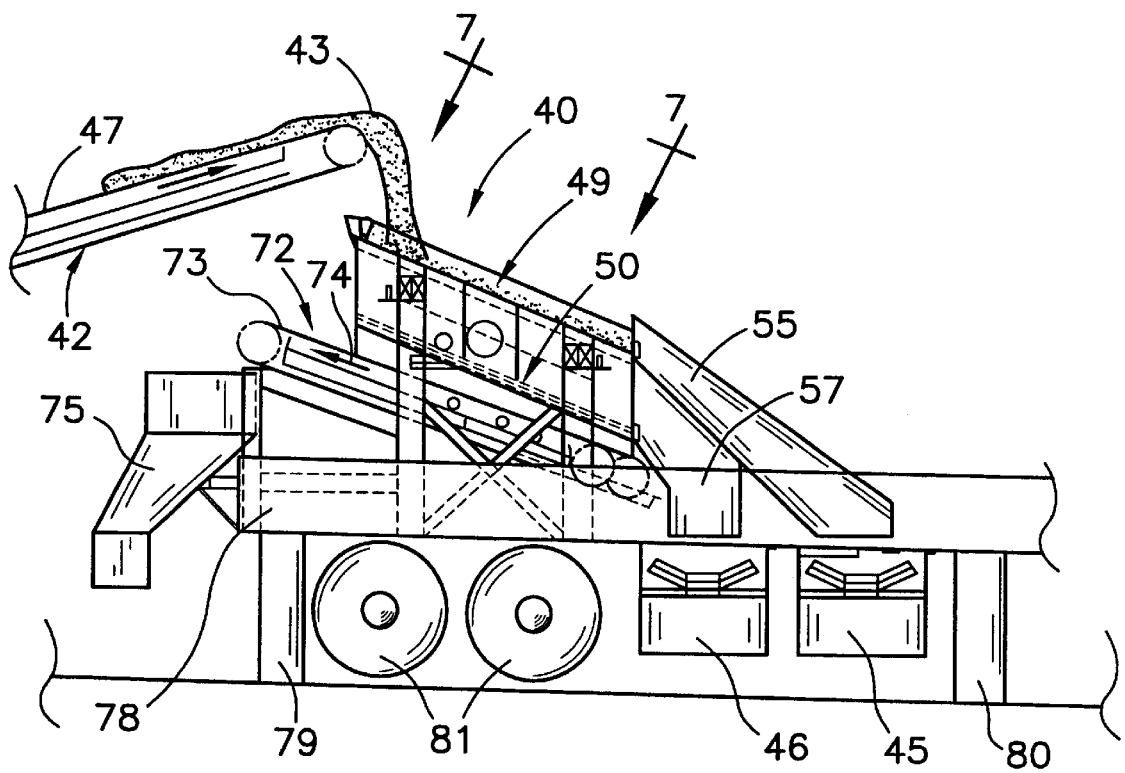
FIG. 6 is a perspective schematic view of a classification machine for classifying granular material and which delivers granular material to a screen deck having the impact liner of the invention mounted at the impact area of the screen.
Figure 7:
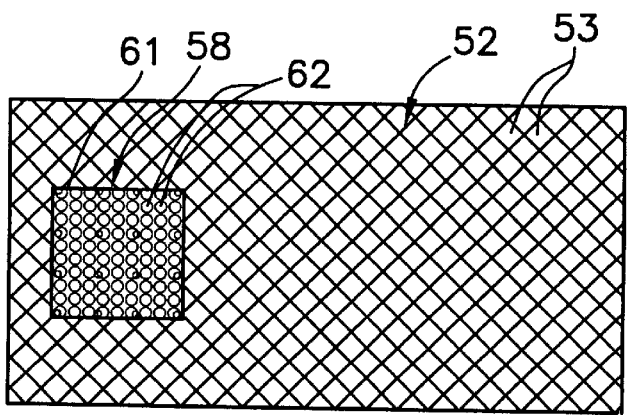
FIG. 7 is a plan view of the screen deck and impact liner of the invention mounted thereon and looking generally along arrows 7—7 of FIG. 6.

Referring now to FIGS. 6 and 7, the impact liner of the invention is shown for use in protecting an impact surface of a screen deck on a granular classification machine, generally indicated by the numeral 40. It should be appreciated that the liner may be used wherever there may be granular materials delivered to an impact area and where it is desired that the impact area may be protected against abrasion and wearing. The machine illustrated is used for sizing of granular material such as coal or stone and it would normally include a number of angularly disposed vibratory screens, each of which would have screen openings of different sizes. Only two screens are shown in the apparatus 40. Moreover, a screen would be mounted at the discharge end of a conveyor and below the discharge end, as seen in FIG. 6. Thus, in order to illustrate the use of an impact liner for a screen deck, reference is primarily made to FIG. 6 and the schematic illustration of the classification machine.

Referring further to FIG. 6, the classification machine 40 receives from a delivery conveyor 42 a stream of granular material 43 such as coal or stone so that the granular material may be sized or classified into granules of different sizes and delivered to conveyors 45 and 46 for transferring the sized particles to a suitable location.

The input conveyor 42 may be any suitable type having an input end not shown and in this instance being a belt conveyor having a belt 47 arranged on an incline to deliver the stream of granular material 43 to the classification machine.

The classification machine 40 includes an upper vibratory conveyor 49 and a lower vibratory conveyor 50 disposed at a downward incline from the input ends where the granular material is received. Each of the vibratory conveyors comprises a screen deck such as the screen deck 52 of the upper vibratory conveyor 49, which is shown also in FIG. 7. The screen deck includes a plurality of sized apertures 53 chosen for the size of granular material to be classified by this conveyor. The output end of the conveyor 49 feeds to the input end of a chute 55 that in turn delivers the granular material classified to the transfer conveyor 45.

All granules smaller than the openings in the screen deck 52 fall through to the screen deck on the lower vibratory conveyor 50 which would have apertures of smaller openings than those in the screen deck 52. The size of the granules classified by the lower vibratory conveyor 50 are then delivered to the input end of a chute 57 which delivers the smaller size granular material to the conveyor 46.

All granules passing through the screen deck of the lower vibratory conveyor 50 go to a belt conveyor 72 having a belt 73 with an upper run moving in the direction of the arrow 74 to deliver the fines and granular material passing through the screen deck of the lower conveyer to a chute 75 which merely directs these granules to the ground.

It will be appreciated that the upper and lower vibratory conveyors 49 and 50, together with the chutes 55, 57 and 75 and the transfer conveyors 45 and 46, are supported by a suitable frame 78. Suitable posts 79 and 80 support the frame of the machine on the ground when it is being operated, while it will be appreciated that wheels 81 are provided so that the classification machine may be transported to another location if desired.

The impact liner according to the present invention for use with a screen deck is shown as being mounted on the upper screen deck 52 in FIG. 7. It is mounted at a location where the granular stream 43 is expected to impact in order to provide protection to the screen deck at that location against abrasion and wear. It will be appreciated that the impact liner 58 may be secured to the screen deck by suitable fastening bolts, nuts and washers that are arranged with the fastener openings of the liner, such as shown in FIG. 2 of the earlier embodiment. Additionally, it will be appreciated that suitable clamps may be provided for clamping the edges of the impact line directly to the screen deck.

While the impact liner 58 is shown to be mounted on an inclined surface of a screen deck, it will be appreciated that it may be mounted on the surface of a horizontally disposed vibratory screen deck if desired. It will therefore be appreciated that the life of the screen deck of impact of the granular stream will be greatly enhanced by the impact line of the invention. Otherwise, the impact liner will function in the same manner as described above with respect to the chute liner wherein granules will fill up the areas between the knobs on the impact liner and provide a renewable wear surface.

The impact liner 58 is similar to the chute liner 26 in that it is made of a molded elastomeric material and it includes a base plate 61 having projecting therefrom a plurality of knobs 62. The shape of the knobs 62 is identical to the shape of the knobs 30 in the chute liner 26, that being of a dual tapered configuration and being truncated conically with two conical faces, although any number of conical faces may be provided. However, the arrangement of the knobs 62 differs in that they are not in staggered relation to each other but in rows vertically and horizontally. However, they are spaced apart like the spacing of the knobs in the chute liner 26 in that the knobs are spaced apart somewhat more than the size of the smallest granules of granular material to be impacting the liner so that granular material will accumulate between the knobs to afford a renewable wear surface similar to that illustrated in FIG. 3. However, it may be appreciated, that the impact liner for the screen deck may be otherwise the same as the chute liner wherein the knobs are in staggered relation relative to each other. Further, it will be appreciated that the embodiments of FIGS. 8 to 13, which will be described below, also show the knobs to be in aligned relation with each other rather than being staggered, but it should be appreciated that these knobs may also be arranged in staggered relation if so desired. The embodiments of FIGS. 8 to 13 may be used as impact liners for the chute in FIG. 1, the screen deck in FIG. 6, or wherever needed to protect against wear by impacting granular material.

Figure 8:
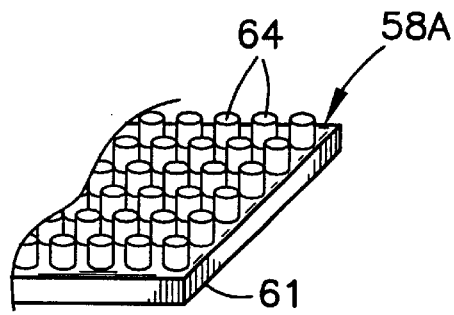
FIG. 8 is a fragmentary perspective view of a modified liner according to the invention where the knobs are cylindrical in configuration.
Figure 9:
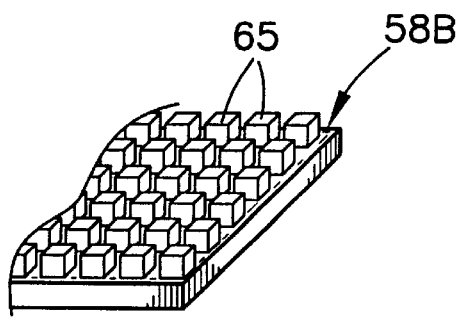
FIG. 9 is a further fragmentary perspective view of another knob configuration according to the invention wherein the knobs are square in cross section.
Figure 10:
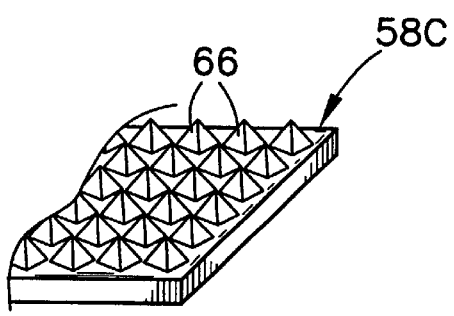
FIG. 10 is a further fragmentary perspective view of another knob configuration according to the invention wherein the knobs are pyramidically configured.
Figure 11:
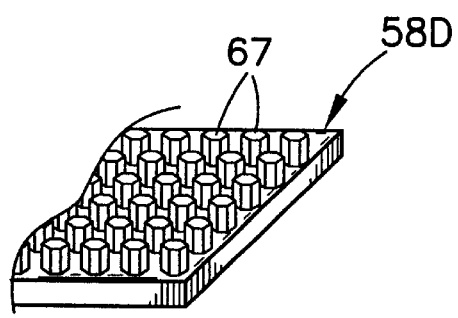
FIG. 11 is a further fragmentary perspective view of another knob configuration according to the invention wherein the knobs are hexagonally configured.
Figure 12:
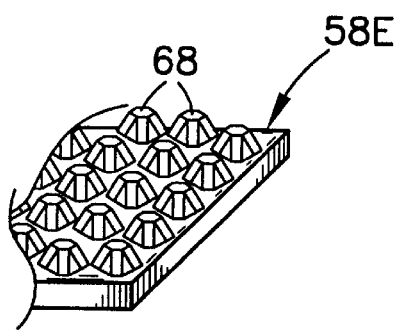
FIG. 12 is a further fragmentary perspective view of another knob configuration according to the invention wherein the knobs are truncated pyramidically.
Figure 13:
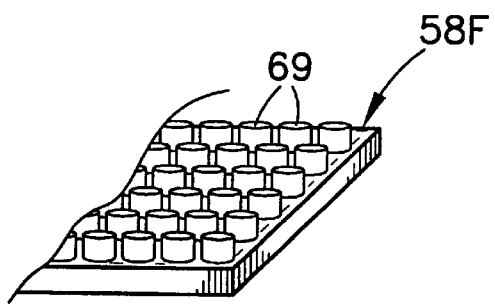
FIG. 13 is a further fragmentary perspective view of another knob configuration according to the invention wherein the knobs are oval in cross section.

Another knob configuration is shown in the embodiment of FIG. 8 which is generally designated by the numeral 58A, wherein the knobs are designated by the numeral 64 and are cylindrically shaped. Thus, the cross section of those knobs is cylindrical. The further embodiment shown in FIG. 9 and generally designated by the numeral 58B shows the knobs to be rectangular or square in configuration and therefore square in cross section. A still further type of knob configuration is shown in FIG. 10, wherein the liner is generally designated by the numeral 58C and the knobs 66 of this embodiment are pyramidally shaped. A further knob configuration is shown in FIG. 11 with the liner 58D, wherein the knobs 67 are hexagonally shaped. And yet still a further knob configuration is shown in FIG. 12, wherein the liner is generally designated by the numeral 58E and the knobs 68 are shown to be of truncated pyramidal configuration, and it will be appreciated that any number of flat sides may be provided in such a configuration. Finally, a further embodiment of an impact liner is shown in FIG. 13, and generally designated by the numeral 58F, wherein the knobs 69 are oval in configuration or elliptically configured. It will be appreciated that the knobs may take any suitable configuration but that the spacing between the knobs will be such that it will be greater than the size of the smaller granules of the granular material impacting thereon so that granular material can accumulate between the knobs to define a renewable wear surface along the liner.

From the foregoing description of the impact liner, it will be apparent that the liner of the invention is simple and inexpensive to manufacture. Installation either in a conveyor chute or on a screen deck is also simple and inexpensive, utilizing the integral mounting apertures 28 or other suitable means. The liner effectively eliminates or at least minimizes the problem of abrasion, in part because a part of the granular material itself (e.g., coal, stone aggregate, ash, etc.) serves as a buffer for the impact surface or surfaces for granular material. It will be recognized that the knob height is subject to appreciable variation, as from one inch to three inches. Knob spacing may be varied in accordance with the size of the granules in the material being conveyed. The dimensions shown in the drawings, particularly FIGS. 2 and 5, are typical but not critical.

It will be understood that modifications and variations may be effected without departing from the scope of the novel concepts of the present invention, but it is understood that this application is to be limited only by the scope of the appended claims.

The invention is hereby claimed as follows:

1. The combination of a conveyor bearing granular coal, aggregate, or other granular material within a given granular size range, at least one impact surface against which the granular material impacts when the material is input to or discharged from the conveyor, and a liner for the impact surface, the improvements in the liner which comprises:

an impact base plate of molded elastomeric material having a base portion, a multiplicity of knobs molded integrally with the base plate and projecting therefrom when the liner is mounted on the impact surface, the knobs each being of substantially conical configuration and spaced from each other by distances greater than the size of the smaller granules of the granular material so that some of the granular material accumulates between the knobs to define a renewable wear surface along the liner, and means for mounting the liner on the impact surface with the base portion of the liner covering at least a portion of the impact surface.

2. The combination as set forth in claim 1, wherein the knobs are equally spaced from each other.

3. The combination as set forth in claim 1, wherein the knobs are arranged in staggered relation to each other.

4. The combination as set forth in claim 1, wherein the knobs are of truncated conical configuration.

5. The combination as set forth in claim 1, wherein the knobs are of dual tapered configuration.

6. The combination as set forth in claim 5, wherein the knobs include a base portion having a taper of about 15 degrees and an end portion having a taper of about 25 degrees.

7. The combination as set forth in claim 2, wherein the knobs are arranged in staggered relation to each other.

8. The combination as set forth in claim 7, wherein the knobs are of truncated conical configuration.

9. The combination as set forth in claim 7, wherein the knobs are of dual tapered configuration.

10. The combination as set forth in claim 9, wherein the knobs include a base portion having a taper of about 15 degrees and an end portion having a taper of about 25 degrees.

11. An impact liner for the impact surface of a screen deck in a classification machine against which granular material impacts, said liner comprising:
a base plate of molded elastomeric material,
a multiplicity of knobs molded integrally with the base plate and projecting therefrom when the liner is mounted on an impact surface of the screen deck,
said knobs being of substantially identical configuration and spaced from each other by distances greater than the size of the smaller granules of the granular material so that some of the granular material accumulates between the knobs to define a renewable wear surface along the liner.

12. The impact liner of claim 11, wherein the knobs are staggered and equally spaced apart from each other.

13. The impact liner of claim 12, wherein the knobs are of truncated conical configuration.

14. The impact liner of claim 12, wherein the knobs are polygonal in cross section.

15. The impact liner of claim 12, wherein the knobs are rectangular in cross section.

16. The impact liner of claim 12, wherein the knobs are square in cross section.

17. The impact liner of claim 12, wherein the knobs are circular in cross section.

18. The impact liner of claim 12, wherein the knobs are oval in cross section.

19. The impact liner of claim 12, wherein the knobs are hexagonal in cross section.

20. The impact liner of claim 12, wherein the knobs are of pyramidal configuration.

21. The impact liner of claim 12, wherein the knobs are of truncated pyramidal configuration.

22. The impact liner of claim 12, wherein the knobs are of dual tapered configuration.

23. The impact liner of claim 22, wherein the knobs include a base portion having a taper of about 15 degrees and an end portion having a taper of about 25 degrees.

24. An impact liner for the impact surface of a generally inclined member against which granular material impacts, said liner comprising:
a base plate of molded elastomeric material,
a multiplicity of knobs molded integrally with the base plate and projecting therefrom when the liner is mounted on an impact surface of the screen deck,
said knobs being of substantially identical configuration and spaced from each other by distances greater than the size of the smaller granules of the granular material so that some of the granular material accumulates between the knobs to define a renewable wear surface along the liner.

25. The impact liner of claim 24, wherein the knobs are staggered and equally spaced apart from each other.

26. The impact liner of claim 25, wherein the knobs are of truncated conical configuration.

27. The impact liner of claim 25, wherein the knobs are polygonal in cross section.

28. The impact liner of claim 25, wherein the knobs are rectangular in cross section.

29. The impact liner of claim 25, wherein the knobs are square in cross section.

30. The impact liner of claim 25, wherein the knobs are circular in cross section.

31. The impact liner of claim 25, wherein the knobs are oval in cross section.

32. The impact liner of claim 25, wherein the knobs are hexagonal in cross section.

33. The impact liner of claim 25, wherein the knobs are of pyramidal configuration.

34. The impact liner of claim 25, wherein the knobs are of truncated pyramidal configuration.

35. The impact liner of claim 25, wherein the knobs are of dual tapered configuration.

36. The impact liner of claim 35, wherein the knobs include a base portion having a taper of about 15 degrees and an end portion having a taper of about 25 degrees.

* * * * *